July 10, 1962 J. PILIERO 3,043,347
SPIRAL COMPRESSION SPRING AND METHOD
AND MACHINE FOR MAKING SAME
Filed Sept. 16, 1959 5 Sheets-Sheet 1

INVENTOR.
BY James Piliero
Olson & Trexler attys.

July 10, 1962 J. PILIERO 3,043,347
SPIRAL COMPRESSION SPRING AND METHOD
AND MACHINE FOR MAKING SAME
Filed Sept. 16, 1959 5 Sheets-Sheet 2

INVENTOR.
James Piliero
BY
Olson & Trexler
attys.

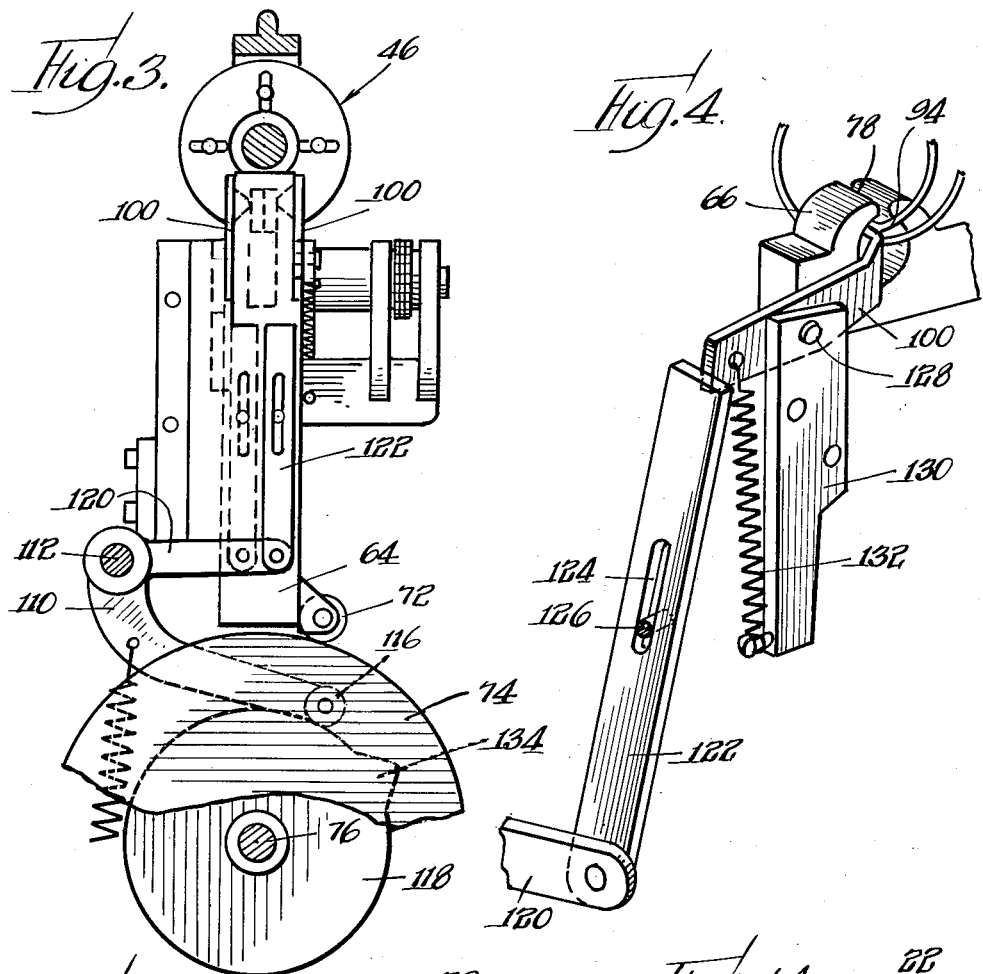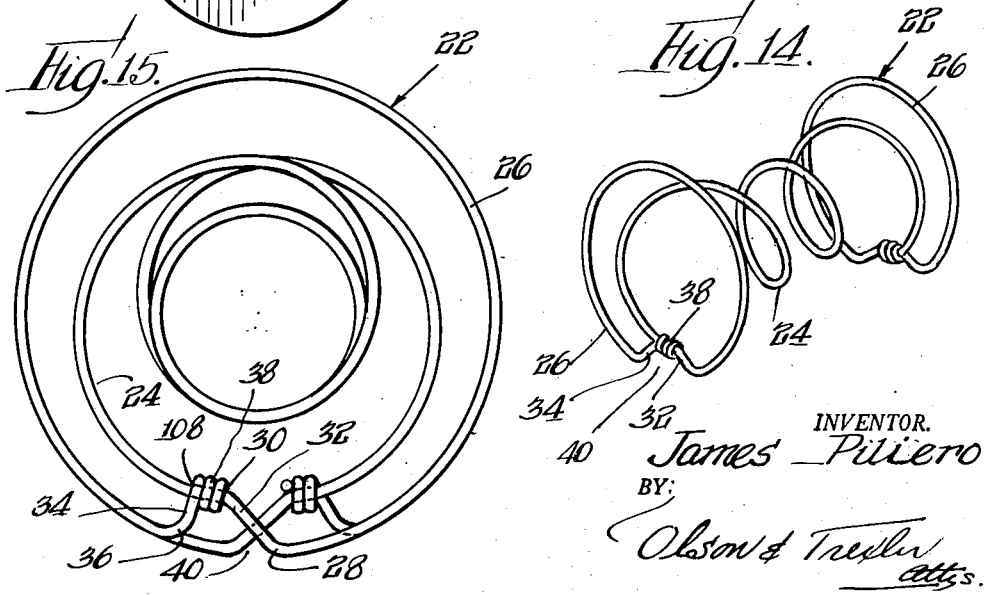

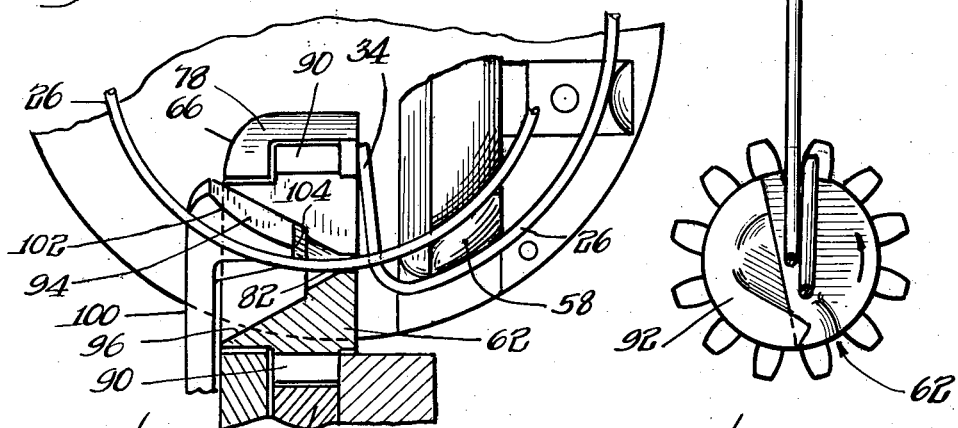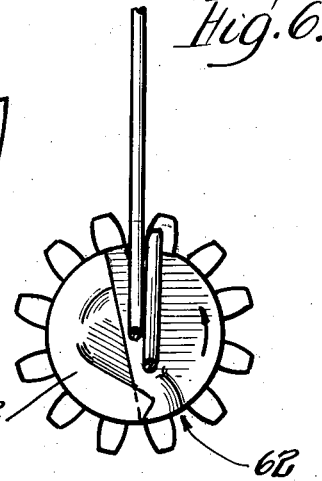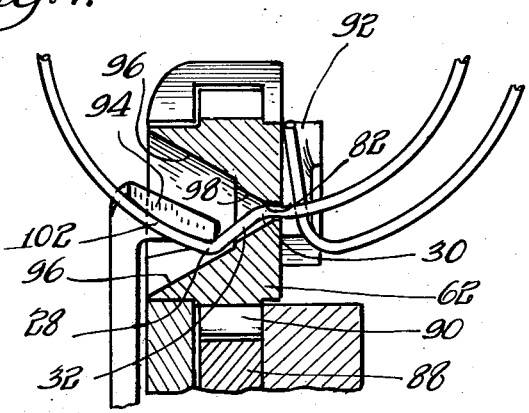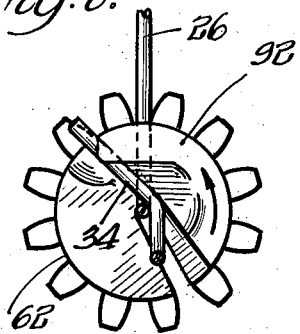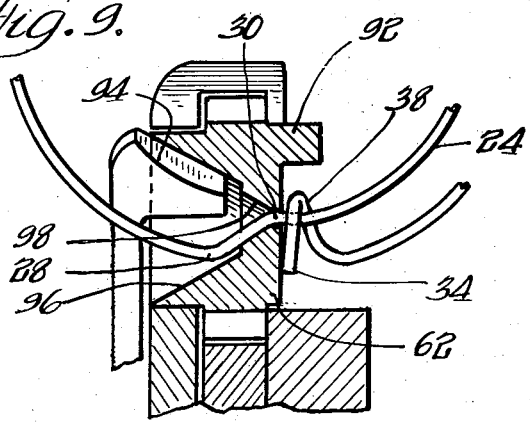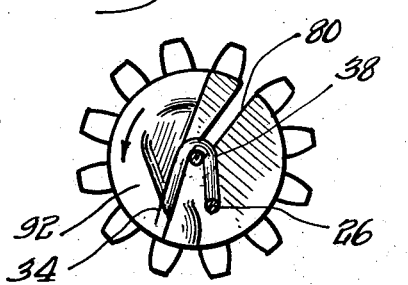

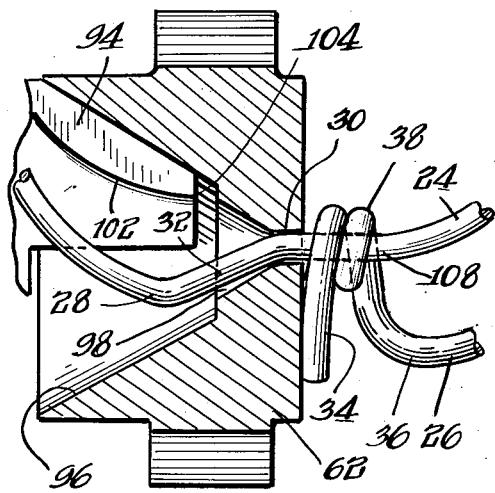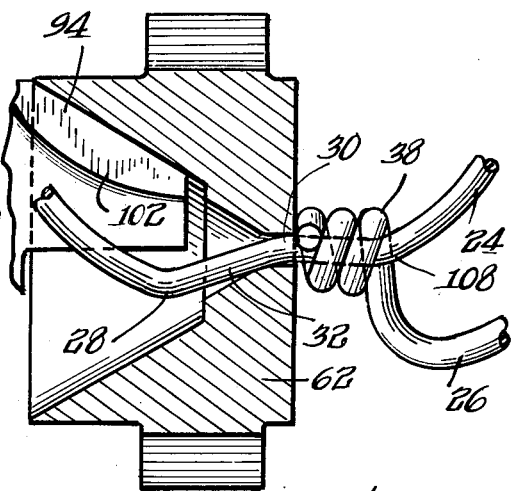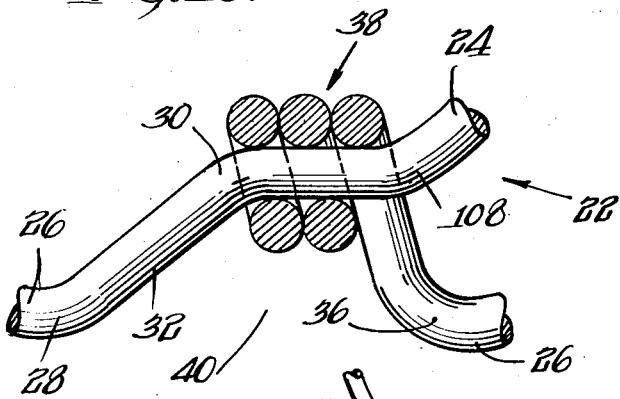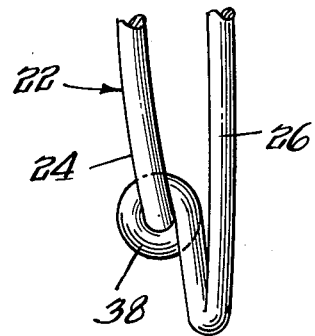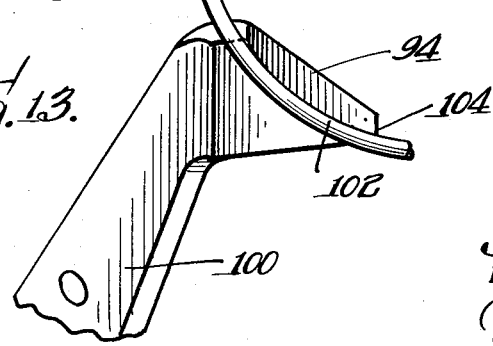
INVENTOR.
James Piliero
BY: Olson & Trexler
attys.

United States Patent Office 3,043,347
Patented July 10, 1962

3,043,347
SPIRAL COMPRESSION SPRING AND METHOD
AND MACHINE FOR MAKING SAME
James Piliero, Astoria, N.Y., assignor to The Englander
Company, Inc., Chicago, Ill., a corporation of Delaware
Filed Sept. 16, 1959, Ser. No. 840,462
14 Claims. (Cl. 140—101)

The present invention relates to spiral compression or cushioning springs manufactured for use in innerspring mattresses, box springs, and the like.

Such springs have substantial axial length and terminate at one or both ends in generally coplanar terminal convolutions disposed in planes which are generally perpendicular to the axes of the springs. It has been recognized that many advantages are gained by forming the springs to have terminal convolutions which have the shape of true circles. In an ideal spring of this type, the terminal convolutions would have the form of complete, perfect circles. This would greatly facilitate assembly of the springs together to form spring cores for innerspring mattresses, and the like, and would provide a highly advantageous accuracy in the dimensions of the spring assemblies constructed from such ideal springs.

Yet, as a practical matter, spiral cushioning springs adapted to be manufactured on a commercial basis have circumferential discontinuities or gaps in the circular terminal convolutions of the springs at the junctures of the terminal convolutions with the adjoining spiral convolutions of the springs. The existence of such discontinuities in the circular form of the terminal convolutions complicates the matter of assembling the springs together to form innerspring mattress cores, for example.

One object of the invention is to provide for use in innerspring mattresses, box springs, and the like, an improved spiral compression or cushioning spring of the above character which is formed in a manner that produces on at least one end of the spring a coplanar terminal convolution having a truly circular form that is materially lengthened circumferentially by a marked reduction in the arcuate extent of the circumferential discontinuity of the terminal convolution at its connection with the adjoining spiral convolutions of the spring.

Another object is to provide an improved spiral compression spring, as recited in the above object, having an improved construction which at once sharply reduces the circumferential discontinuity in the circular form of the spring terminal convolution or convolutions and provides a more positive locking of the initially free ends of the terminal convolutions to the adjacent ends of the adjoining spiral convolutions of the spring.

Another object is to provide an improved method of making a spiral compression spring of the character recited which sharply reduces the circumferential discontinuity in the circular form of each terminal convolution of the spring.

Another object is to provide for automatically manufacturing spiral compression springs of the above character, a new and improved machine having a structural organization and mode of operation which provides great speed and efficiency in the knotting and shaping of the springs to have truly circular terminal convolutions while at the same time simplifying the structure of the machine which performs these operations.

Another object is to provide an improved spring forming and knotting machine which will automatically produce spiral compression springs of the character recited that are shaped in the machine to have truly circular terminal convolutions and at the same time the initially free ends of the terminal convolutions are knotted to the adjoining spiral convolutions of the spring.

A further object is to provide, for automatically producing spiral cushioning springs of the above character, an automatic machine having a novel construction and mode of operation which shapes the springs to have truly circular terminal convolutions and knots the initially free ends of the terminal convolutions on the adjoining spiral convolutions in a manner which effects a very substantial minimization of the circumferential discontinuity in the circular form of each terminal convolution.

An additional object of the invention is to provide an automatic spring manufacturing machine which operates with great efficiency to rapidly produce spiral cushioning springs having truly circular terminal convolutions the initially free ends of which are secured to the adjacent ends of the spiral convolutions by knots which are positively locked against sliding movement in either direction along the spiral convolutions.

A further object is to provide a new and improved spring manufacturing machine as recited in the preceding objects which is well adapted to be produced economically, in that it can be formed for the most part from components of conventional spring forming and knotting machines.

Other objects and advantages will appear from the following description of the invention taken with reference to the accompanying drawings, in which:

FIG. 2 is a fragmentary perspective view of the machine taken generally from the back side of the machine with reference to FIG. 1;

FIG. 3 is a fragmentary vertical sectional view, taken generally along the line 3—3 of FIG. 1;

FIG. 4 is a fragmentary perspective view of spring bending structure incorporated into the machine;

FIG. 4A is a fragmentary elevational view showing a knotting element of the machine;

FIG. 5 is a simplified fragmentary sectional view, taken along a vertical plane extending through the center of one of the knotting elements, as indicated by the lines 5—5 in FIG. 2;

FIG. 6 is a detail view taken with reference to the right end of FIG. 5 and showing the positional relationship of the knotter to coacting spring elements near the beginning of the knotting operation;

FIG. 7 is a view similar to FIG. 5, illustrating a later phase of the spring knotting operation during which reverse bends are formed in the spring, as shown in this figure;

FIG. 8 is a right end view of elements appearing in FIG. 7;

FIG. 9 is a view similar to FIG. 7, showing a still later phase of the knotting operation at the completion of the spring bending action;

FIG. 10 is a right end view of FIG. 9;

FIG. 11 is an enlarged and somewhat simplified detail view corresponding to FIG. 9 but illustrating the continuation of the knotting cycle;

FIG. 12 illustrates the relationship of the spring to the knotter at the completion of the knotting action;

FIG. 13 is a fragmentary perspective view showing a spring bending element of the machine in engagement with a segment of a spring terminal convolution;

FIG. 14 is a perspective view of a cushioning spring formed by the machine;

FIG. 15 is an enlarged end view of the spring of FIG. 14;

FIG. 16 is an enlarged, partially sectioned, fragmentary view illustrating the improved construction of the compression spring provided by the invention; and FIG. 17 is a fragmentary view of the spring taken with reference to the right hand side of FIG. 16.

Figure 1:
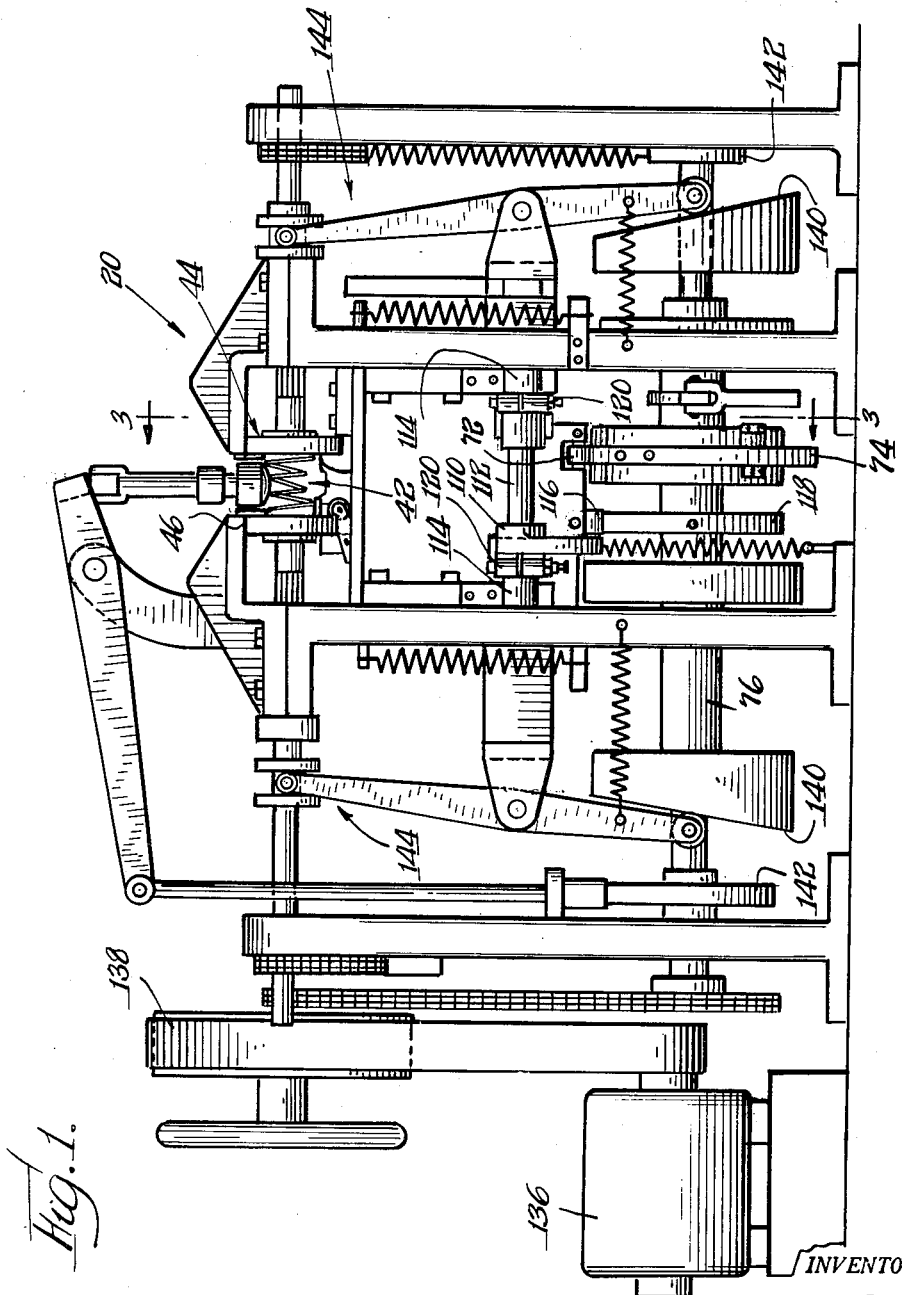
FIGURE 1 is an end elevational view of an automatic spring producing machine incorporating the invention.

The automatic spring producing machine 20, FIG. 1, provided by the invention produces improved spiral compression or cushioning springs 22, illustrated in FIGS. 14 to 17. An understanding of the construction and operation of the machine 20 is facilitated by a preliminary review of the general construction of the springs 22 produced by the machine.

Thus, as shown in FIG. 14, a spring 22 produced by the machine 20 has an axially elongated, hourglass form and comprises spiral convolutions 24 extending between and merging integrally at opposite ends with two terminal convolutions 26 disposed in generally parallel planes spaced from each other. It will be noted that the spiral convolutions 24 increase progressively in diameter from the center of the spring toward the respective terminal convolutions 26.

Each spring 22 is shaped in the machine 20 so that each terminal convolution 26 has the form of a true, though incomplete, circle. In providing the desired circular form of each terminal convolution 26, the machine 20 operates to form in each end of the spring 22 two reverse bends 28, 30 which connect opposite ends of an intervening component segment 32 of the spring with the adjoining ends of the adjacent terminal convolution 26 and spiral convolutions 24, as shown in FIG. 15.

The initially free end 34 of each terminal convolution 26 is turned radially inward through a sharp bend 36, circumferentially spaced from the adjacent bend 28, and secured to the adjacent end of the spiral convolutions 24 by a knot 38.

It is particularly noteworthy, with reference to FIGS. 14 and 15, that the intervening spring segments 32 and the terminal convolution end portions 34 all turn radially inward with reference to the terminal convolutions 26 and offset the knots 38 radially inward with respect to the terminal convolutions 26. Thus, opposite ends of the circular portion of each terminal convolution 26 are interconnected by inwardly offset components of the spring, which include the intervening spring segment 32, knot 38, and the terminal convolution end portion 34. This leaves a circumferential discontinuity or gap in the circular form of the end convolution. This discontinuity extends between the bends 28 and 36 at opposite ends of the circular portion of each terminal convolution and is designated in FIGS. 14 and 16 by the number "40".

The existence of this discontinuity 40 in the circular form of each terminal convolution 26 creates problems in assembling the springs together to form innerspring mattress cores, and the like, which problems are in a sense somewhat proportional to the arcuate extent of the discontinuities 40.

The improvements made in the cushioning springs 22 in accordance with the present invention and the significance of these improvements will be referred to later.

The automatic machine 20 provided by the invention for producing the springs 22 is designed to be constructed in large measure from components of a conventional automatic spring coiling and tying machine. Automatic spring coiling and tying machines, as such, are well known and widely used in this art. In general, such machines operate to coil wire stock into the form of axially elongated spiral compression springs, the free ends of which are automatically knotted to adjacent spiral convolutions of the springs.

The instant machine 20 illustrated in the drawings incorporates in its construction the major portion of the spring coiling and tying components of a widely used automatic spring coiling and tying machine manufactured by the Frank L. Wells Company of Kenosha, Wisconsin. In view of the general usage and commercial availability of such coiling and knotting machines, it is not necessary here to describe all of its component structure in detail.

In the machine 20 wire stock is coiled by conventional coiling elements (not shown) to form axially elongated, double-ended spiral spring elements, which for convenience in discussion may be referred to as coiled spring blanks. One such coiled spring blank is illustrated in FIG. 2 and designated by the reference number 42.

As initially formed by the conventional coiling structure in the machine 10, each coiled spring blank 42 has the overall general form of the completed spring 22 illustrated in FIG. 14. At this stage the intermediate spiral convolutions 24 of the spring to be formed from the blank are completed except for critical shaping of opposite ends of the spiral convolutions in a matter to be described presently. The two extreme end convolutions of each spring blank 42 are integral continuations of the intermediate spiral convolutions of the spring blank and have a slightly spiral form, the axial lead of each end convolution of the spring blank being greatly reduced as compared to the lead of the intermediate spiral convolutions. The extreme ends of the spring blank are free and untied to the adjoining spiral convolutions extending between opposite ends of the spring blank.

The partially completed springs or spring blanks 42 thus formed in a conventional manner in the machine 20 are moved laterally into a spring knotting and shaping position between two axially opposed movable heads 44, 46, FIGS. 1 and 2, designed to clamp and hold the partially formed end or terminal convolutions of each blank for knotting of the free ends of the terminal convolutions to the adjacent ends of the intervening spiral convolutions of the blank. The construction of the two opposed heads 44, 46, as such, is conventional, the two heads being identical to each other. Spring support and clamping elements mounted on and coacting with each of the heads 44, 46 locate and hold the adjacent spring blank terminal convolution in a generally circular coplanar position as shown in FIGS. 2 and 5.

The spring support and clamping elements mounted on and coacting with each of the opposed heads 44, 46 to locate and hold the adjacent spring blank terminal convolution as described are conventional. The terminal convolution holding and clamping elements coacting with the head 46 and visible in FIG. 2 are identified by the reference numbers 50, 52, 54, 56 and 60.

For simplicity in description, component segments of the coiled spring blank 42 being formed into a completed spring as illustrated in FIGS. 1–12 are identified in the drawings by the same reference numerals previously applied to corresponding components of the completed spring.

Each spring blank terminal convolution 26 clamped in a circular coplanar position as described is oriented rotatably with respect to a horizontal axis so that the juncture of the terminal convolution 26 with the adjacent end of the intermediate spiral convolutions 24 is located at the bottom of the terminal convolution, as shown in FIG. 5, in overlying relation to a rotary knotting element 62 carried by a vertically movable slide 64, FIG. 2. The slide 64 supports a horizontally spaced pair of knotting elements in underlying relation to the respective terminal convolutions 26 of the spring blank 42 disposed between the two heads 44, 46. The two knotting elements 62 are structurally identical and are turned end to end relative to each other to correspond to the similar orientation of the two opposed heads 44, 46 relative to each other.

Each rotary knotting element 62 is covered by an overlying housing or cover element 66 as shown in FIGS. 4, 4A, and 5. The free end portion 34 of each spring blank terminal convolution 26 is supported by the coacting one of the heads 44, 46 as described to project transversely across the cover 66 of the underlying knotting element 62. The ensuing vertical movement of the slide 64 engages notches 68 in the respective knotting element covers 66, FIG. 4A, with the horizontally projecting terminal convolution ends 34 to swing these end portions vertically upward, as shown in FIG. 5, as the slide 64 and knotting element covers 66 continue to move upwardly.

The juncture of each terminal convolution end portion 34 with the adjoining main portion of the terminal convolution is supported against vertical movement by the lower end of the support element 58 on the adjoining head, which projects into overlying relation to the terminal convolution as shown in FIG. 5. Hence upward swinging movement of each terminal convolution end portion 34 around the lower end of the associated head support element 58 forms the previously mentioned bend 36, FIGS. 5 and 15, in the terminal convolution by which the adjacent free end portion 34 of the terminal convolution is turned radially inward.

It may be noted that the slide 64 is shifted upwardly from its normal position to its raised knotting position (which movement effects upward bending of the terminal convolution end portions 34 as described), by a cam follower 72, FIG. 2, mounted on the lower end of the slide in engagement with a disc cam 74 carried by a master cam shaft 76, which extends transversely across the front of the machine as shown in FIG. 1. The periphery of the cam 74 is shaped to effect proper timing in the upward movement of the knotting element support slide.

Lifting of the slide 64 causes opposite ends of the overlying coiled spring blank 42 at the junctures of the respective terminal convolutions 26 with the intervening spiral convolutions 24 to enter transverse slots 78, FIGS. 4 and 4A, in the respective knotting element covers 66. The cover slots 78 are alined with radial slots 80 defined in the respective knotting elements 62. As upward movement of the slide 64 continues, the portions of the spring blank 42 received in the knotting element cover slots 78 pass radially through the knotting element slots 80 to be received in short axial openings 82 formed in the centers of the respective knotting elements 62 at the inner ends of the slots 80.

Simultaneously with movement of the slide 64 into its uppermost position in the manner described, the knotting elements 62 are engaged with power-driving means which rotates the knotting elements in unison to form the previously mentioned knots 38 in opposite ends of the spring being produced. During rotation of the knotting elements to form the knots 38 in a manner to be presently described in detail, opposite ends of the spiral convolutions 24 of the spring blank 42 are supported in the short axial openings 82 in the respective knotting elements.

Rotation of the knotting elements 62 in opposite directions to form the spring knots 38 is effected through conventional knotter driving components of the machine which include, as shown in FIG. 2, a chain drive 84 connected through a clutch 86 (which is automatically engaged as an incident to lifting of the slide 64) to two counter-rotating gears 88 that mesh with gears 90 integrally formed on the peripheries of the respective knotting elements, FIGS. 2 and 5. Standard control means incorporated into the machine 20 effects energization of the knotting element chain drive 84, FIG. 2 simultaneously with movement of the slide 64 into its uppermost position. Moreover, movement of the drive 84 is automatically stopped to stop the two knotting elements 62 in their respective starting positions in which the knotter slots 80 are alined with the knotter cover slots 78 after the knotting elements have been rotated through three complete revolutions.

Rotation of each knotting element 62 through three complete revolutions as recited effects a wrapping of the adjacent terminal convolution end portion 34 around the adjacent end of the spiral convolutions 24 to form the knot 38 which ties down the initially free end of the associated terminal convolution. For this purpose a wrapping lug or element 92 is formed on the end of each knotting element 62 facing the adjacent end of the spiral convolutions 24 as shown in FIGS. 6–10.

The structural design and mode of operation of each wrapping element 92 conforms to that of similar wrapping elements on knotters used in conventional spring coiling and knotting machines. In general, each wrapping element 92 projects a short distance axially from the adjacent end of the main portion of the associated knotting element 62 and has a shape as viewed from one end, FIG. 6, conforming to that of a sector of a circle somewhat smaller than a semicircle.

Rotation of the knotting element causes the projecting wrapping element 92 to engage the free end 34 of the adjacent spring terminal convolution 26 and progressively wrap the terminal convolution end portion 34 around the adjacent end of the spiral convolutions 24 as shown in FIGS. 5–12.

During an early phase of the spring knotting action, which is accomplished during the three revolutions of the respective knotting elements 62, the machine 20 embodying the invention operates without interrupting or delaying the spring knotting action to form the two previously mentioned reverse bends 28, 30 in each end of the spring being formed. It will be recalled that the two bends 28, 30 in each end of a spring 22 are spaced from each other by an intervening supporting spring segment 32 which together with the inwardly turned end portion 34 of the associated terminal convolution 26 effects an offsetting of the adjacent knot 38 radially inward from the terminal convolution. Moreover the formation of the two reverse bends 28, 30 in each end of the spring being formed effects, as will presently appear, a shaping of the spring to produce terminal convolutions 26 which are truly circular except for the previously mentioned discontinuities 40.

In accordance with the invention, the two reversed bends 28, 30 are formed in opposite ends of a spring by the coaction of two spring bending elements 94, FIGS. 4, 5, 7, 9, and 13, with the respective knotting elements 62.

Each spring bending element 94 is movably disposed within the end of the coacting knotting element 62 opposite from the attached wrapping element 92. As shown, each bending element 94 is accommodated within a conical counterbore 96 in a conical opening 98 formed in the associated knotting element 62 in concentric relation to the rotary axis of the knotting element and having its small end merging with the central axial opening 82 in the knotting element, which accommodates the adjacent end of the spiral spring convolutions 24 in the manner described. Thus, both the axially extending conical opening 98 and the conical counterbore 96 formed in each knotting element 62 diverge radially outward from the end of the knotting element opening 82 opposite from the adjacent wrapping element 92.

Each spring bending element 94 is supported on the free end of an external lever 100 in a manner to be described presently to project radially into the counterbore 96 of the associated knotting element 62 toward the knotting element 82 as shown in FIGS. 5, 7, 9, 11, and 12.

Each bending element 94 has a normal position, illustrated in FIG. 5, in which it is radially spaced from the axis of the associated knotting element 62 toward the center of the spring terminal convolution 26 extending out of the knotting element. When located in its normal position, each spring bending element 94 is free and clear of the adjacent portion of the terminal convolution 26 extending past the bending element in a circular path from the adjacent knotting element opening 82.

The back side of each bending element 94 has a segmental conical shape adapted to fit closely against the conical surface of the counterbore 96 which accommodates the bending element. The opposite or terminal convolution side of the bending element 94 defines an arcuate spring engaging surface 102, FIGS. 5, 11, and 13, extending a substantial distance along the adjacent terminal convolution and having a radius of curvature conforming to the radius of the adjacent terminal convolution 26.

The inner end of the spring opposing surface 102 on each bending element 94 terminates abruptly at the juncture 104 of the surface 102 with the extreme inner end of the bending element 94 as shown in FIGS. 5, 11, and 13. This extreme inner end 104 of each bending element spring opposing surface 102 has a spacing from the adjacent end of the associated knotting element opening 82 along the rotary axis of the knotting element which is approximately equal to the length of the previously mentioned intervening spring support segment 32 between the bends 28, 30 at each end of the completed spring 22, FIG. 15.

During an initial phase of the spring knotting operation previously described, each spring bending element 94 is moved from its normal position shown in FIG. 5 radially with respect to the rotary axis of the associated knotter 62 to cross the rotary axis of the knotter and continue to an extreme position, illustrated in FIG. 7, in which the inner end 104 of the spring engaging surface 102 of the bending element is displaced beyond the rotary axis of the knotter a distance which is sufficient to form the two reverse bends 28, 30 in the adjacent end of the spring. The bend 28 is formed at the inner end or terminus 104 of the spring opposing surface 102. The other bend 30 is formed at the adjacent end of the opening 82 in which the spring is supported in the knotting element 62 as shown in FIG. 7.

Thus the previously mentioned spacing of the spring opposing surface 102 of each bending element 94 from the knotting element opening 82 provides the desired length of the intervening spring support segment 32. The previously mentioned arcuate shaping of the spring opposing surface 102 of the bending element preserves the circular form of the segment of the terminal convolution 26 engaged by the bending element.

Having set the two bends 28, 30 in the adjacent end of the spring, each bending element 94 is retracted toward its normal position long before the knotting operation in progress is completed.

Wrapping of each terminal convolution end portion 34 about the adjacent end of the spiral convolution 24 emerging from the adjacent ends of the associated knotting element openings 82 forms an incipient knot 38, as shown in FIGS. 9 and 10, in which the terminal end portion 34 being wrapped forms a tight grip on the spring segment extending through the incipient knot. Moreover, as shown in FIG. 9, the incipient knot 38 being formed by wrapping of the coacting spring end portion 34 takes shape immediately adjacent the adjacent end of the coacting knotting element 62.

At the time that formation of the bends 28, 30 in each end of the spring is completed in the manner described, a substantial length of the adjacent terminal convolution end portion 34 remains to be wrapped into the knot 38 being formed. Continued wrapping of each knot 38 elongates the knot toward the coacting knotting element 62 and in the direction of the adjacent spring bend 30. The effect is to cause the knot being formed to abut hard against the adjacent face of the coacting knotting element 62 with the incipient knot simultaneously taking a firm grip on the adjacent end of the spiral convolutions 24.

The result is to produce a forced retraction through the adjacent knotting element opening 82 of the segment of the spring initially supported within this opening and extending to the adjacent bend 30. An intermediate phase of the retraction of the spring segment previously supported within the adjacent opening 82 into the knot 38 being formed is illustrated in FIG. 11.

As a matter of fact the retraction of the spring through each knotting element opening 82 pulls the adjacent reverse bend 30 through the knotting element opening 82 to the end of the knotting element opposite from the spring bending element 94, as shown in FIG. 12.

The axial length of each knot 38 substantially exceeds the length of each knotting element opening 82 and is sufficient to extend along the spring from the incipient knot formed by initial wrapping of the spring end portion 34, FIG. 9, all the way up to the adjacent bend 30, FIGS. 12 and 16.

Retraction of the spring through the respective knotting element openings 82 in the course of wrapping the knots 38 in the manner described effects a tipping or swinging movement of each spring support segment 32 in a direction, as shown in FIGS. 11 and 12, which swings the outer end of the segment toward the center of the adjacent terminal convolution 26. This tipping or swinging movement of each spring support segment 32 as the adjacent bend 30 is drawn through the coacting knotting element opening 82 swings in the same direction the adjoining portion of the spring about which the adjacent knot 38 is being wrapped. At the same time the adjacent end of the spiral convolutions 24 extending to the knot 38 is supported by support means including the element 58 on the adjacent one of the heads 44, 46.

The result is to produce in each end of the spring being formed a third bend 108 which is convex redially outward and located at the point, FIG. 12, where the adjacent end of the spiral convolutions 24 enters the knot 38.

Thus the bends 108 are formed in opposite ends of the springs automatically as an incident to wrapping of the respective knots 38 to extend all the way up to the adjacent bends 30 in the manner described. The significance of this will be more fully discussed presently.

As previously mentioned the two knotting elements 62 are automatically returned to their starting positions at the completion of the knotting operation, whereupon the slide 64 is lowered to retract the knotting elements out of engagement with the completely formed spring. The heads 44, 46 are operated in a conventional manner to release the completed spring which is removed by a suitable transfer mechanism.

As shown in FIGS. 1–4, the means provided for operating the spring bending elements 94 during the knotting operation as described comprises a generally horizontal actuator lever 110 fixed at its forward end to a transverse rocker shaft 112 journalled in bearing supports 114 on the front of the machine. The rear end of the lever 110 carries a cam following roller 116 in engagement with a cam 118 on the master control shaft 76.

Two levers 120 are non-rotatably fixed to the rocker shaft 112 in laterally spaced relation to each other to extend rearwardly in a generally horizontal direction to effect actuation of the respective bending elements 94. The means used to transmit power from the respective arms 120 to the respective bending elements 94 are basically identical. Hence a description of one will suffice for both.

As shown in FIGS. 2–4, the rear end of each arm 120 is pivotally connected to the lower end of a generally vertical slide bar 122 defining a medial longitudinal slot 124 which receives a stationary guide pin 126. The orientation of the parts is such that each slide bar 122 is disposed in a generally vertical position when the actuator arm 110 is in its normal position.

Each bending element operating lever 100 is swingably supported on a medial pivot 128 on a bracket 130. The end of the lever 100 opposite from the adjoined bending element 94 projects laterally into rearwardly spaced relation to the normal position of the upper end of the coacting slide bar 122. Each lever 100 is biased by a spring 132 in a direction for urging the coacting bending element 94 to its normal position.

The positional relationship of the levers 100 relative to the coacting slide bars 122 is such that when the slide bars 122 are in their normal positions the levers 100 are free to move vertically with the slide 64 without engagement with the slide bars 122.

However, when the slide 64 is in its upper knotting position, counterclockwise operating movement of the arms 120 by the cam 118, with reference to FIG. 3, moves the lower ends of the slide bars 122 through arcuate paths which lifts the slide bars while at the same time effecting a tipping of the slide bars about the guide pins 126 to swing the upper ends of the guide bars into underlying engagement with the respective levers 100. Continued upward movement of the guide bars 122 effects the previously described downward movement of the bending elements 94 to form the reverse bends 28, 30 in the spring being formed.

The relatively quick operating movements of the bending elements 94 are timed by a rather sharp single lobe 134 formed on the cam 118, FIG. 3, to actuate the cam follower 116.

It will be observed with reference to FIG. 1 that the machine 20 is powered by an electric motor 136 which energizes the machine through a speed reducing transmission 138 connected to operate the working parts of the machine, which include the previously mentioned control shaft 76. Other cams and parts 140, 142, for example, are interconnected through conventional shafts, levers and the like 144 in a conventional manner to produce the necessary axial and rotary movements of the heads 44, 46 essential to operation of these components of the machine.

Thus the improved machine 20 operates with the same speed and efficiency as a conventional spring coiling and knotting machine.

Further, with regard to the improved character of the springs 22, it will be appreciated at this point that the previously mentioned reverse bends 28, 30, formed in opposite ends of each spring during the knotting operation, shape the terminal convolutions 26 into the form of true circles.

Moreover, the springs 22, fashioned by the spring forming method carried out by the machine 20, are improved by a marked reduction in the circumferential extent of the previously mentioned discontinuities 40 in the circular form of the respective terminal convolutions 26. The reduction in the arcuate extent of each discontinuity 40 is accomplished by the winding of the adjacent knot 38 after the reverse bends 28, 30 are formed so that the knot extends all the way up to the inner reverse bend 30 as described, thereby eliminating any spacing between the knot 38 and the inner bend 30.

This reduction in the extent of the discontinuities 40 facilitates assembly of the completed springs 22 into spring cores for innerspring mattresses and the like.

Also, the construction of the improved springs 22 positively precludes slipping of the knots 38, each of which is interposed between the two spring bends 30, 108 formed in the spring immediately adjacent opposite ends of the knot as shown in FIG. 16.

It will be understood that the invention is not necessarily limited to use of the particular structure illustrated but includes the use of variants and equivalents within the scope of the invention as defined by the claims.

The invention is claimed as follows:

1. The method of making a spiral cushioning spring comprising, providing an axially extending spiral spring having spiral convolutions integrally joined at one end with a terminal convolution, supporting in a short narrow opening in a holder a segment of a spiral convolution spaced somewhat from the adjoining end of the terminal convolution, engaging a portion of the terminal convolution spaced a short distance from the adjacent end of the holder opening while supporting within the holder opening the spring segment placed therein, moving said terminal convolution portion relative to said spring segment in a radially outward direction with respect to the center of said terminal convolution to form in the section of the spring intervening between the holder opening and said terminal convolution portion two spaced reverse bends adjacent the spring portion and the holder opening respectively, and wrapping the free end of the terminal convolution around the adjacent end of the spiral convolutions at the end of the holder opposite from the intervening spring section to form a knot which is extended by the wrapping thereof in the direction of the holder to retract the spiral convolution segment through the holder opening to extend the knot all the way up to the adjacent one of the bends.

2. The method of making a spiral compression spring comprising, providing an axially extending spiral spring having spiral convolutions integrally merging at one end with a terminal convolution, supporting in a holder a short segment of a spiral convolution spaced somewhat from the adjoining end of the terminal convolution; engaging and moving radially outward with respect to said spiral convolution segment a portion of said terminal convolution spaced a short distance from the holder to form in the section of the spring intervening between the holder and said spring portion two spaced, sharply reversed bends adjacent the terminal convolution portion and the holder respectively, and wrapping the free end of the terminal convolution around the adjacent end of the spiral convolutions at the end of the holder opposite from said reverse bends formed in said intervening section of the spring.

3. The method of making a cushioning spring comprising, providing an axially extending coil spring having spiral convolutions integrally merging at one end with a terminal convolution, shaping a segment of the spring at the juncture of the terminal convolution with the adjacent end of said spiral convolutions to form two spaced reverse bends offsetting the terminal convolution end of the spiral convolutions radially inward with respect to the terminal convolution, and wrapping the free end of the terminal convolution around the terminal convolution end of the spiral convolutions inwardly of the innermost one of said reverse bends to form a knot around said terminal convolution end of the spiral convolutions extending all the way up to said innermost reverse bend.

4. In a machine for coiling and knotting axially extending spiral springs each including a terminal convolution disposed in a plane generally perpendicular to the axis of the spring, the combination of a rotary knotting element defining an axial opening therethrough and a slot extending radially outward from said opening, means for moving through said slot into said opening a component segment of a spiral spring adjacent a terminal convolution of the spring, said knotting element including on the end thereof opposite from the terminal convolution end of the knotting element a wrapping element extending radially from said opening, means for bending the free end portion of the terminal convolution of a spring fitted into said opening into position for engagement by said wrapping element upon rotation of said knotting element, a spring bending element having a normal position disposed in immediately adjacent spaced relation to the terminal convolution end of said knotting element opening and offset laterally from the axis of said opening toward the center of the terminal convolution of a spring received in said knotting element, said bending element defining an arcuate spring engaging surface facing toward the extended axis of said knotting element opening, and means for moving said bending element from said normal position thereof laterally past said extended axis of said knotting element opening in timed relation to rotation of said knotting element to permanently form reverse bends in a portion of a spring extending from said opening into alinement with said bending element.

5. In a machine for knotting and shaping spiral compression springs having terminal convolutions at opposite ends, the combination of support means for supporting spaced terminal convolutions of a spring, a movable carrier, a pair of rotary knotters on said carrier, actuating means coacting with said carrier to shift the latter from a normal position into an operative position which engages said knotters with opposite end portions of a spring supported by said support means, driving means for rotating said knotters in the operative position thereof, each knotter including a wrapping element on one end thereof for wrapping a spring knot upon rotation of the knotter, spring forming elements movably disposed at the ends of said respective knotters opposite from said respective wrapping elements, pivoted levers mounted on said carrier and supporting said respective forming elements for moving the latter from normal positions thereof through bending strokes extending across the rotary axes of the respective knotters in radially outward directions with respect to a coacting spring to form reverse bends in each end of the spring, a pair of swingable actuating arms, means interconnecting said actuating arms with said actuating means to swing said arms reversibly through individual operating cycles thereof, a pair of slide bars connected with said respective arms and having normal positions which clear the paths of movement of said levers during movement thereof by said carrier, and support means coacting with said slide bars to effect swinging movement of the latter into operative engagement with said levers to effect movement of said levers through operating cycles which effect movement of said forming elements through the spring bending strokes thereof and return of the forming elements to said normal positions thereof as an incident to movement of said arms through individual operating cycles thereof.

6. In a machine for knotting and shaping spiral springs having terminal convolutions at opposite ends thereof, the combination of a pair of opposed heads adapted to support a spiral spring disposed therebetween, a movable carrier, a pair of rotary knotting elements mounted on said carrier, each of said knotting elements defining a central opening therethrough for receiving a segment of a spring disposed between said heads, actuating means coacting with said carrier to shift the latter from a normal position to an operative position in which a spring disposed between said heads is received in the knotting elements, each knotting element including a knot wrapping element on one end thereof for wrapping a spring end onto a spring segment extending through the knotting element to form on the spring segment a knot which is wrapped axially toward the knotting element opening, said knotting elements defining axial recesses extending therein from the ends of the knotting elements opposite from the wrapping elements, a pair of levers pivotally supported on said carrier, a pair of spring bending elements mounted on said respective levers and extending into the recesses in said respective knotting elements, means normally locating said bending elements in normal positions radially spaced from the rotary axes of said knotting elements toward the axis of a spring disposed between said heads, a pair of actuating slide bars having normal positions which clear the paths of movement of said levers upon movement of said carrier, actuating means coacting with said slide bars to swing the latter out of said normal positions thereof and into engagement with said levers when said carriage is in said normal position thereof to move said levers through individual operating cycles which effect movement of said spring bending elements from the normal positions thereof in radially outward directions across the axes of said knotting elements and immediate return of the bending elements to the normal positions thereof to form in the segment of the spring projecting from the end of each knotting element opposite from the knot wrapping element thereon two reverse bends spaced from each other, and means coacting with said knotting elements to effect rotation thereof and continue rotation of the knotting elements to complete the wrapping of knots in a spring subsequent to the bend forming movement of said bending elements.

7. In a machine for coiling and knotting axially extending spiral springs each including a terminal convolution, the combination of a rotary knotting element defining an axial opening therethrough, means for fitting into said knotting element opening a component segment of a spiral spring adjacent the terminal convolution thereof, said knotting element including a wrapping element on the end thereof opposite from the adjacent end of the terminal convolution of a coacting spring extending through said opening in the knotting element, means for bending the free end portion of a spring terminal convolution radially inward for engagement by said wrapping element upon rotation of said knotting element, a spring bending element having a normal position adjacent the end of said knotting element opposite from said wrapping element and offset from the rotary axis of the knotting element in a radially inward direction with respect to the axis of a coacting spring extending through the knotting element, said bending element defining a spring engaging surface facing toward the axis of said knotting element and spaced from the adjacent end of said knotting element opening, means for moving said bending element through individual operating cycles which momentarily move the bending element from said normal position thereof laterally past the rotary axis of said knotting element to permanently form in a portion of a spring extending from said knotting element opening into alinement with said bending element reverse bends which effect a radially outward offsetting of the adjacent portion of the terminal convolution of the spring, and means for rotating said knotting element to wrap the free end of the spring terminal convolution around said component segment of the spring immediately inward of the innermost one of said reverse bends formed by said bending element.

8. In a machine for coiling and knotting axially extending spiral springs each including a terminal convolution, the combination of a rotary knotting element defining a spring receiving opening extending therethrough, said knotting element including a wrapping element on one end thereof, means for fitting into said knotting element opening a component segment of a spiral spring positioned so that a terminal convolution of the spring projects from the end of the knotting element opposite from said wrapping element, means for positioning the free end portion of a spring terminal convolution for engagement by said wrapping element upon rotation of said knotting element, a spring bending element, means for moving said bending element across the axis of said knotting element in a radially outward direction with respect to the axis of a spring extending through the knotting element and in a path located beyond the end of said knotting element opening opposite from said wrapping element to permanently form in a portion of a spring extending from said knotting element opening into alinement with said bending element reverse bends which effect a radially outward offsetting of the adjacent terminal convolution of the spring, and means for rotating said knotting element to wrap the free end of the spring terminal convolution around said component segment of the spring to form a knot immediately adjacent the innermost one of said reverse bends.

9. In a machine for knotting and shaping spiral springs having a terminal convolution at one end thereof, the combination of support means for supporting a spring, a movable carrier, a rotary knotting element mounted on said carrier and defining an axial opening therethrough for receiving a segment of a spring supported by said support means, actuating means coacting with said carrier to shift the latter from a normal position to an operative position in which a spring supported by said support means is received in said knotting element opening, said knotting element including a knot wrapping element on one end thereof for wrapping the free end of the terminal convolution of the spring around a spring segment extending through the knotting element opening to form on the spring segment a knot which is wrapped toward the knotting element opening, a lever pivotally supported on said carrier, a spring bending element mounted on said lever for movement thereby across the end of said opening opposite from said wrapping element, an actuating element having a normal position which clears the path of said lever upon movement of said carrier, actuating means coacting with said actuating element to move the latter out of said normal position thereof and into engagement with said lever when said carriage is in said normal position thereof to move said spring bending element momentarily across the axis of said knotting element in a radially outward direction with respect to the axis of a spring extending through the knotting element in the segment of the spring intervening between the knotting element and said bending element reverse bends which effect a radially outward offsetting of the adjacent end of the spring terminal convolution, and means coacting with said knotting element to effect rotation thereof which is continued subsequent to formation of said reverse bends.

10. The method of making a spiral compression spring comprising, providing an axially elongated coiled spring having terminal convolutions at opposite ends thereof and spiral convolutions extending between the terminal convolutions and merging integrally therewith, supporting opposite ends of the spiral convolutions in narrow openings in spring support elements, engaging portions of said respective terminal convolutions spaced short distances from the adjacent ends of said respective spring support elements; moving said terminal convolution portions relative to said spring convolution ends supported in said support elements in radially outward directions with respect to the centers of said terminal convolutions to form in the segments of the spring intervening between each of said terminal convolution portions and the adjacent support element two spaced reverse bends, the radially innermost one of which is turned radially outward and located immediately adjacent the adjacent spring support element, and wrapping the ends of the respective terminal convolutions about the respective adjacent ends of the spiral convolutions immediately adjacent the ends of the respective support elements which are opposite from said respective intervening spring segments to retract opposite ends of said terminal convolutions through the openings in the respective support elements and form knots extending up to the adjacent ones of said reverse bends formed in the springs.

11. The method of making a spiral compression spring comprising, providing an axially elongated coiled spring having terminal convolutions at opposite ends thereof and spiral convolutions extending between the terminal convolutions and merging integrally therewith, supporting opposite ends of the spiral convolutions in openings extending through rotary spring knotters in concentric relation to the rotary axes of the respective knotters, engaging spring bending elements with portions of said respective terminal convolutions spaced short distances from the adjacent ends of the spring supporting portions of said respective knotters; moving the spring bending elements radially outward across the rotary axes of said respective knotters to displace said terminal convolution portions radially outward with respect to said convolution ends supported in said knotters to form in the segment of the spring intervening between each bending element and the adjacent knotter two spaced reverse bends, the innermost one of which is turned radially outward and located immediately adjacent the adjacent knotter, retracting said spring bending elements, and wrapping the ends of the respective terminal convolutions about the respective adjacent ends of the spiral convolutions immediately adjacent the ends of the respective knotter openings which are opposite from respective intervening spring segments to retract opposite ends of said terminal convolutions through said respective knotters and form knots extending up to the adjacent ones of said reverse bends formed in the springs.

12. In a machine for knotting and shaping a spiral spring having terminal convolutions at opposite ends, the combination of two spring support heads disposed in opposing spaced relation to each other for supporting terminal convolutions of a spring disposed therebetween, two rotary knotting elements, means for effecting movement of said knotting elements into coacting relation to a spring supported between said heads, two spring forming elements mounted in adjacent relation to said respective knotting elements and having normal positions spaced from the axes of the respective knotting elements, means coacting with said forming elements to move the latter from the normal positions thereof across the axes of the respective knotting elements in radially outward directions with respect to the centers of the terminal convolutions of a coacting spring to form reverse bends in each end of the spring embraced by said knotting elements, means for rotating said knotting elements, and each of said knotting elements including a wrapping element spaced from the adjacent spring forming element for engagement with the free end of an adjacent spring terminal convolution as an incident to rotation of the knotting element to wrap the free end of the terminal convolution around the spring inwardly of the innermost one of the adjacent reverse bends to form a knot extending up to said innermost adjacent bend.

13. In a machine for coiling and knotting axially extending spiral springs each including a terminal convolution, the combination of a rotary knotter including spring support means defining an opening extending therethrough along the axis thereof, said knotter including a knot wrapping element at one end of said knotter opening, means for effecting positioning of said knotter in coacting relation to a spring to locate within the knotter opening a segment of the spring adjacent the terminal convolution of the spring and to cause the terminal convolution to project from the end of the knotter opening opposite from the wrapping element, means for positioning the free end of the terminal convolution of the spring in relation to said wrapping element to be wrapped by the latter around an adjacent segment of the spring toward said knotter opening, a spring bending element disposed at the end of said knotter opening opposite from said wrapping element and having a normal position axially spaced from the knotter opening and radially spaced from the rotary axis of the knotter toward the axis of a spring positioned in coacting relation to the knotter, means for moving said spring bending element through individual operating cycles which momentarily carry the spring bending element radially outward across the rotary axis of said knotter to form through the coaction with the spring of said bending element and said spring support means in the knotter reverse bends in the intervening segment of the spring which offset the adjacent inner end of the spring terminal convolution in a radially outward direction, and means for rotating said knotter to effect wrapping of the free end of the terminal convolution around the portion of the spring which emerges from the wrapping element end of said knotter opening.

14. In a machine for coiling and knotting axially extending spiral springs each including a terminal convolution, the combination of a rotary knot wrapping element, means for effecting positioning of said wrapping element in coacting relation to a spring adjacent the inner end of a terminal convolution of the spring, means for positioning the free end of the terminal convolution of the spring in coacting relation to said wrapping element to be wrapped by the latter around an adjacent segment of the spring, means for supporting the spring immediately adjacent said wrapping element and at the side thereof adjacent the inner end of the spring terminal convolution, a spring bending element disposed at the side of the spring support means opposite from said wrapping element and having a normal position spaced from the rotary axis of the wrapping element in a radially inward direction with respect to the axis of a spring positioned in coacting relation to the wrapping element, means for moving said spring bending element through individual operating cycles which momentarily carry the spring bending element radially outward across the rotary axis of the spring wrapping element to form through the coaction of the spring bending element and said spring support means with the intervening segment of a spring reverse bends in the intervening segment of the spring which offset the adjacent inner end of the spring terminal convolution in a radially outward direction, and means for rotating said knotting element to effect wrapping of the free end of the terminal convolution around the portion of the spring supported by said support means to form a knot wrapped toward the innermost one of said reverse bends.

References Cited in the file of this patent

UNITED STATES PATENTS

| | | |
|---|---|---|
| 1,259,869 | Jackson | Mar. 19, 1918 |
| 1,751,072 | Brandt | Mar. 18, 1930 |
| 1,867,128 | Wunderlich | July 12, 1932 |
| 2,058,679 | Gilmore | Oct. 27, 1936 |
| 2,066,861 | Simmons | Jan. 5, 1937 |
| 2,150,755 | Zimmerman | Mar. 14, 1939 |
| 2,230,110 | Gleason | Jan. 28, 1941 |
| 2,641,758 | Levine | June 9, 1953 |